(12) United States Patent
Green et al.

(10) Patent No.: US 12,251,740 B2
(45) Date of Patent: Mar. 18, 2025

(54) FLUID PURGING SYSTEM

(71) Applicant: CNX Resources Corporation, Canonsburg, PA (US)

(72) Inventors: Brian Green, Eighty-Four, PA (US); Joseph M. Fink, Washington, PA (US); Nathan Horne, Waynesburg, PA (US); Matthew Imrich, McMurray, PA (US)

(73) Assignee: CNX Resources Corporation, Canonsburg, PA (US)

( * ) Notice: Subject to any disclaimer, the term of this patent is extended or adjusted under 35 U.S.C. 154(b) by 0 days.

(21) Appl. No.: 18/364,374

(22) Filed: Aug. 2, 2023

(65) Prior Publication Data

US 2023/0408020 A1 Dec. 21, 2023

Related U.S. Application Data

(62) Division of application No. 17/492,113, filed on Oct. 1, 2021, now abandoned.

(51) Int. Cl.
*B08B 9/032* (2006.01)
*B05B 15/55* (2018.01)
(Continued)

(52) U.S. Cl.
CPC ............ *B08B 9/0321* (2013.01); *B05B 15/55* (2018.02); *B08B 3/08* (2013.01); *B60P 1/56* (2013.01);
(Continued)

(58) Field of Classification Search
CPC ......... B08B 3/08; B08B 9/0321; B05B 15/55; B67D 7/0294; B67D 7/0288; B67D 7/04;
(Continued)

(56) References Cited

U.S. PATENT DOCUMENTS 2,012,362 A * 8/1935 Thomas .................... B67D 7/00
222/394
6,325,093 B1 * 12/2001 Ooshima .............. G05D 7/0682
239/69

(Continued)

FOREIGN PATENT DOCUMENTS

WO 2006032899 A1 3/2006

OTHER PUBLICATIONS

Notification of transmittal of the international search report and the written opinion of the international searching authority, or the declaration, International application No. PCT/US2022/044849 filed Sep. 27, 2022, mailed Jan. 20, 2023, 11 pages.

*Primary Examiner* — Atif H Chaudry

(57) ABSTRACT

A method for reducing emissions from a vessel includes isolating the vessel from a downstream fluid flow line, purging a fluid from the vessel by injecting purging media into the vessel to push the fluid through a check valve of a vent tubing and into the downstream fluid flow line, and draining the purging media from the vessel. A first end of the vent tubing is coupled to the housing of the vessel, and a second end of the vent tubing is coupled to the downstream fluid flow line. Further, the vent tubing includes a check valve disposed between the first end and the second end, and the check valve is configured to allow fluid to flow from the housing to the downstream fluid flow line.

12 Claims, 7 Drawing Sheets

(51) Int. Cl.
- B08B 3/08 (2006.01)
- B60P 1/56 (2006.01)
- B60P 3/22 (2006.01)
- B63B 22/02 (2006.01)
- B63B 27/24 (2006.01)
- B63B 27/34 (2006.01)
- B65D 90/30 (2006.01)
- B65G 63/00 (2006.01)
- B65G 67/04 (2006.01)
- B65G 67/24 (2006.01)
- B67D 7/02 (2010.01)
- B67D 7/04 (2010.01)
- B67D 7/78 (2010.01)
- B67D 9/00 (2010.01)
- F16L 55/07 (2006.01)
- F16T 1/34 (2006.01)
- F17D 3/10 (2006.01)
- F17D 3/12 (2006.01)
- F04B 23/08 (2006.01)
- F16L 55/46 (2006.01)

(52) U.S. Cl.
CPC ............. *B60P 3/2245* (2013.01); *B60P 3/225* (2013.01); *B60P 3/2265* (2013.01); *B63B 22/021* (2013.01); *B63B 27/24* (2013.01); *B63B 27/34* (2013.01); *B65D 90/30* (2013.01); *B65G 63/004* (2013.01); *B65G 67/04* (2013.01); *B65G 67/24* (2013.01); *B67D 7/0288* (2013.01); *B67D 7/0294* (2013.01); *B67D 7/04* (2013.01); *B67D 7/0476* (2013.01); *B67D 7/048* (2013.01); *B67D 7/049* (2013.01); *B67D 7/78* (2013.01); *B67D 9/00* (2013.01); *F16L 55/07* (2013.01); *F16T 1/34* (2013.01); *F17D 3/10* (2013.01); *F17D 3/12* (2013.01); *F04B 23/08* (2013.01); *F16L 55/46* (2013.01); *F17C 2227/0135* (2013.01)

(58) Field of Classification Search
CPC .......... B67D 7/0476; B67D 7/78; B67D 9/00; B67D 7/048; B67D 7/049; B60P 1/56; B60P 3/2245; B60P 3/225; B60P 3/2265; B65G 67/24; B65G 67/04; B65G 63/004; B63B 27/24; B63B 27/34; B63B 22/021; B65D 90/30; F17C 2227/0135
See application file for complete search history.

(56) References Cited

U.S. PATENT DOCUMENTS

| | | |
|---|---|---|
| 6,604,536 B1 | 8/2003 | Davey et al. |
| 6,841,007 B1 | 1/2005 | Howard et al. |
| 2007/0151603 A1 | 7/2007 | McCully |
| 2009/0321077 A1 | 12/2009 | Norman |

* cited by examiner

FLUID PURGING SYSTEM

CROSS REFERENCE TO RELATED APPLICATION

This application is a divisional application of U.S. application Ser. No. 17/492,113 entitled "FLUID PURGING SYSTEM," filed Oct. 1, 2021 which is incorporated herein by reference in its entirety.

TECHNICAL FIELD OF THE INVENTION

The present disclosure relates generally to vessels holding or transporting fluids and, more particularly, to systems and methods for reducing emissions when purging the fluids from the vessels.

BACKGROUND

Hydrocarbons, such as crude oil and natural gas, are produced or obtained from wells drilled into subterranean reservoir formations. The produced hydrocarbons are then transported to a gathering facility, processing facility, and/or storage facility via a variety of vessels, which may be transported using oil tankers, trains, or trucks, or which may be a series of networked pipes called pipelines. Vessels will gather produced hydrocarbons from multiple wells before transporting the produced hydrocarbons to a compressor station or processing plant. Then once the hydrocarbons are treated or refined, they are typically transported to a distribution center.

Vessels for holding or transporting produced hydrocarbons, such as pipelines may have a variety of sizes with the largest pipelines being up to 48 inches in diameter. Additionally, some pipelines may be as short as a mile while others may extend 1,000 miles or more. Further, a majority of pipelines carrying hydrocarbons are buried with only certain components, such as pump stations or compressor stations, disposed above ground. In order to efficiently and safely transport the hydrocarbons, the pipelines must be kept free of defects and blockages. Reduced system efficiencies or blockages may occur due to a build-up of debris, fluid, or scale left behind by the flow of the produced hydrocarbons through the pipelines. Additionally, defects such as corrosion or stress corrosion cracking may occur due to the flow of hydrocarbons through the pipelines. In order to clean out pipelines to prevent blockages and to inspect pipelines to detect defects, pipeline intervention systems may be installed along pipelines to allow for the insertion of pipeline inspection gages (hereinafter "pigs"), which are able to clean or inspect pipelines without interrupting the flow of hydrocarbons through the pipelines.

Pigs come in a variety of shapes and sizes and have a number of potential purposes, including cleaning, liquid removal, drying, batching, chemical treatment, and inspection. For example, pigs may be used to scrape debris and scale off of the walls of pipelines to clear potential blockages, and/or to measure parameters of the pipeline such as diameter, thickness, pressure, metal loss, curvature. Typically, a pig has an outer diameter that is the same as or slightly larger than the internal diameter of the portion of the pipeline it is being run through. Further, in most pipeline intervention systems, pigs have no power source to propel them along the pipeline, and the pigs are carried along the pipeline by the differential pressure along the pipeline. Thus, pigs typically must be inserted into and extracted from pipelines carrying hydrocarbons without disrupting the flow of the hydrocarbons. Thus, special systems are required to make sure that the hydrocarbons that are flowing through the pipeline and that enter the pipeline intervention system during insertion or removal of the pig are not released into the surrounding environment when the pipeline intervention system is opened before and after use.

Pipeline intervention systems consist of a pig launcher and a pig receiver, collectively known as a "pig trap," and the process of running a pig through the pipeline intervention system is called "pigging." The pig is typically inserted into the pipeline by way of the pig launcher, which is installed upstream of the section of pipeline to be pigged. Then, the pig is run through the pipeline to carry out its intended purpose. Lastly, once the pig reaches the end of the section of pipeline to be pigged, the pig is removed from the pipeline by way of the pig receiver, which is installed downstream of the section of pipeline to be pigged. As the pipeline intervention system often requires inserting the pig into and removing the pig from a pipeline with flowing hydrocarbons, gases and other fluids flowing through the pipeline will enter the pig launcher or pig receiver when a valve between the pig launcher or pig receiver and the pipeline is opened to allow insertion of the pig into the pipeline or removal of the pig from the pipeline. Once the pig is inserted or removed and the valve between the pig launcher or pig receiver and the pipeline is closed, it is important that the gases and other fluids flowing through the pipeline that entered the pig launcher or pig receiver from the pipeline are eliminated from the pig launcher or pig receiver in a manner that does not release those gases and other fluids into the environment before the pig launcher or pig receiver is emptied and opened.

Similarly, when emptying any vessel carrying produced hydrocarbons and the greenhouse gases included therewith, the produced hydrocarbons and greenhouse gases must be eliminated from the vessel in a manner that does not release those gases and other fluids into the environment before the vessel may be opened for inspection, cleaning, or repair.

SUMMARY OF THE INVENTION

Embodiments of the present disclosure are directed to systems and methods for reducing emissions from a vessel. In one or more embodiments, a system includes a vessel, a purging media tank, and a first pump. The vessel includes a housing, an isolation valve, a vent tubing, and an inlet and drainage valve. In one or more embodiments, the isolation valve is coupled to the housing and is configured to be coupled to a downstream fluid flow line. Further, in one or more embodiments, the vent tubing includes a first end coupled to the housing and a second end configured to be coupled to the downstream fluid flow line. Furthermore, the vent tubing includes a check valve disposed between the first end of the vend tubing and the second end of the vent tubing, and the vent tubing is configured to allow a fluid to flow from the housing to the downstream fluid flow line. Additionally, in one or more embodiments, the inlet and drainage valve is coupled to the housing. Further, in one or more embodiments, the first pump is coupled to the purging media tank and is configured to be coupled to the inlet and drainage valve. Furthermore, the first pump is configured to pump a purging media between the purging media tank and the housing.

In one or more embodiments, the system further includes a purging media unit, and the purging media tank, the first pump, and the motor are coupled to the purging media unit. Further, in one or more embodiments, the vent tubing is coupled to a top of the housing and the inlet and drainage valve is coupled to a bottom of the housing. Additionally, in one or more embodiments, the vessel further includes a vent valve and an inlet and drainage tubing. In one or more embodiments, the vent valve is coupled to the housing, and the inlet and drainage valve is coupled to the housing by way of the inlet and drainage tubing.

Further, in one or more embodiments, the system includes a second pump which is coupled to the purging media tank and which is configured to be coupled to the inlet and drainage valve. The second pump is configured to pump purging media between the housing and the purging media tank. Furthermore, in one or more embodiments, the first pump is a plunger pump, and the second pump is a vacuum pump.

In one or more embodiments, a method for reducing emissions from a vessel includes isolating the vessel from a downstream fluid flow line, purging a fluid from the vessel which includes injecting a purging media into the vessel, and draining the purging media from the vessel. In one or more embodiments, a check valve is coupled between the vessel and the downstream fluid flow line and the purging media is injected into the vessel to push the fluid through the check valve and into the downstream fluid flow line.

Further, in one or more embodiments, injecting the purging media to the vessel includes coupling a first pump to a purging media tank and the vessel, and pumping the purging media from the purging media tank into the vessel. Furthermore, in one or more embodiments, the method further includes transporting the first pump and the purging media tank to a site of the vessel and the downstream fluid flow line.

Additionally, in one or more embodiments, draining the purging media from the vessel includes coupling a second pump to a purging media tank and the vessel, and pumping the purging media form the vessel into the purging media tank. Further, in one or more embodiments, draining the purging media from the vessel further includes transporting the second pump and the purging media tank to a site of the vessel and the downstream fluid flow line. Furthermore, in one or more embodiments, draining the purging media from the vessel includes opening a vent valve coupled to the vessel.

Further, in one or more embodiments, the method further includes emptying the fluid from the vessel into the downstream fluid flow line. Furthermore, in one or more embodiments, emptying the fluid from the vessel into the downstream fluid flow line includes opening an isolation valve coupled between the vessel and the downstream fluid flow line. Additionally, in one or more embodiments, isolating the vessel from the downstream fluid flow line includes closing an isolation valve coupled between the vessel and the downstream fluid flow line.

In further embodiments of the present disclosure, a system includes a pig launcher/receiver, a purging media tank, and a first pump. In one or more embodiments, the pig launcher/receiver includes a housing, an isolation valve, a mainline valve, a vent tubing, and an inlet and drainage valve. The housing is configured to receive a pig from a pipeline or insert the pig into the pipeline. Further, the isolation valve and the mainline valve are each coupled to the housing and are each configured to be coupled to the pipeline. Furthermore, in one or more embodiments, a first end of the vent tubing is coupled to the housing and a second end of the vent tubing is configured to be coupled to the pipeline. Additionally, the vent tubing includes a check valve disposed between the first end of the vent tubing and the second end of the vent tubing, and the check valve is configured to allow a pipeline fluid to flow from the housing to the pipeline. Further, in one or more embodiments, the inlet and drainage valve is coupled to the housing. Furthermore, in one or more embodiments, the first pump is coupled to the purging media tank and is configured to be coupled to the inlet and drainage valve. Additionally, the first pump is configured to pump a purging media between the purging media tank and the housing.

In one or more embodiments, the system further includes a purging media unit, where the purging media tank, the first pump, and the motor are coupled to the purging media unit. Further, in one or more embodiments, the pig launcher/receiver further includes a second pump. The second pump is coupled to the purging media tank and is configured to be coupled to the inlet and drainage valve. Furthermore, in one or more embodiments, the second pump is configured to pump the purging media between the housing and the purging media tank. Additionally, in one or more embodiments, the first pump is a plunger pump, and the second pump is a vacuum pump. Further, in one or more embodiments, the vent tubing is coupled to a top of the housing, and the inlet and drainage valve is coupled to a bottom of the housing.

Further, in one or more embodiments, a method for reducing emissions from a pig launcher/receiver includes passing a pig through a mainline valve of the pig launcher/receiver, isolating the pig launcher/receiver from a pipeline, purging a pipeline fluid form the pig launcher/receiver, which includes injecting a purging media into the pig launcher/receiver, and draining the purging media from the pig launcher/receiver. In one or more embodiments, the mainline valve is coupled between the pig launcher/receiver and the pipeline. Further, in one or more embodiments, a check valve is coupled between the pig launcher/receiver and the pipeline, and the purging media is injected into the pig launcher/receiver to push the pipeline fluid through the check valve and into the pipeline.

In one or more embodiments, injecting the purging media into the pig launcher/receiver includes coupling a first pump to a purging media tank and the pig launcher/receiver, and pumping the purging media from the purging media tank into the pig launcher/receiver. Further, in one or more embodiments, draining the purging media from the pig launcher/receiver includes coupling a second pump to a purging media tank and the pig launcher/receiver, and pumping the purging media from the pig launcher/receiver into the purging media tank. Furthermore, in one or more embodiments, draining the purging media from the pig launcher/receiver includes opening a vent valve coupled to the pig launcher/receiver. Additionally, in one or more embodiments, isolating the pig launcher/receiver from the pipeline includes closing the mainline valve and an isolation valve, where the isolation valve is coupled between the pig launcher/receiver and the pipeline.

Further, in one or more embodiments, passing the pig through the mainline valve of the pig launcher/receiver includes equalizing the pressure between the pig launcher/receiver and the pipeline, opening the mainline valve, and diverting a flow of the pipeline fluid through an opened isolation valve which is coupled between the pig launcher/receiver and the pipeline. Furthermore, equalizing the pressure between the pig launcher/receiver and the pipeline includes closing a vent valve, where the vent valve is coupled to the pig launcher/receiver, and opening the isolation valve.

Figure 1:
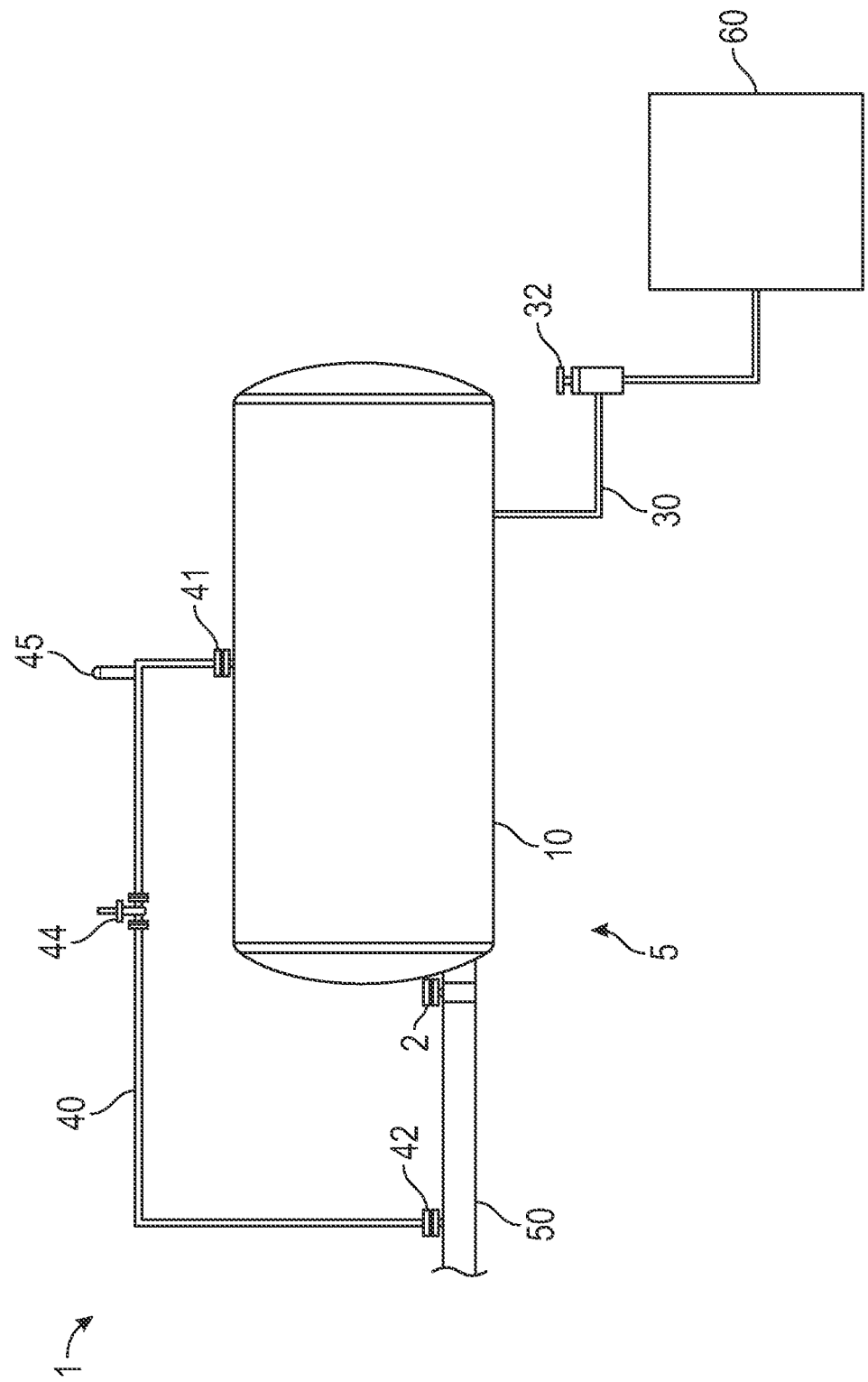
FIG. 1 is a diagram of an illustrative system for purging a fluid from a vessel according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

A system and method for reducing emissions from a vessel carrying a fluid when purging the fluid is desired. The vessel may be any vessel for holding or transporting fluids which, if released from the vessel, may cause a detriment to the environment, such as pipelines, tanks, separators, headers, meter runs, hoses, and pig launchers and receivers. These vessels may be used in any number of industries to carry fluids that contain greenhouse gases, such as in the oil and gas industry. Further, in one or more embodiments, the method for purging a fluid from a vessel may include isolating the vessel and pumping a purging media, which may be an incompressible fluid, into the vessel until the fluid is removed, which greatly reduces emissions. In one or more embodiments, the method for reducing emissions may include isolating the vessel and opening a check valve that is disposed between and fluidly coupled to the vessel and a downstream fluid flow line. Further, in one or more embodiments, a purging media may then be pumped into the vessel at a higher pressure than the pressure of the fluid in the downstream fluid flow line, which will force the fluid out of the vessel through the check valve and leave only the incompressible liquid in the vessel. Then, in one or more embodiments, the purging media may be drained from the vessel, leaving only the atmosphere within the vessel, such that there will be no unwanted emissions when the vessel is next opened.

In one or more embodiments, the vessel may be a pipeline interventions system and the fluid to be purged may be produced hydrocarbons. Thus, a pipeline intervention system configured to insert a pig into a pipeline and remove a pig from the pipeline and prevent the release of gases from products flowing through pipelines into the environment is desired. In one or more embodiments, the pipeline intervention system includes a pig launcher, which is configured to insert a pig into a pipeline, and a pig receiver, which is configured to receive a pig from a pipeline. The pig launcher and the pig receiver may be coupled to a pipeline such that flow through the pipeline may be diverted through the pig launcher and the pig receiver to launch and receive a pig, respectively. Further, the pig launcher and the pig receiver may each include an inlet and drainage valve as well as a check valve that is fluidly coupled between the pig launcher/receiver and the pipeline such that any residual gases left in the pig launcher/receiver after the pig is launched or received may be removed from the pig launcher/receiver so as to empty the pig launcher/receiver and prepare it for being opened. After a pig has been launched or received and the pig launcher/receiver has been sealed off from the pipeline, the inlet and drainage valve may be used to inject a purging media into the pig launcher/receiver, which acts to push any residual fluids remaining in the pig launcher/receiver through the check valve and back into the pipeline. Then, once the residual fluids have been removed from the pig launcher/receiver, the purging media may be drained from the pig launcher/receiver through the inlet and drainage valve, and the pig launcher/receiver may be opened without emitting gases into the environment.

Illustrative embodiments of the present invention are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

The terms "couple" or "couples," as used herein are intended to mean either an indirect or direct connection. Thus, by way of example, if a first device couples to a second device, that connection may be through a direct physical or fluid connection or through an indirect connection by way of tubing and/or valves. Further, the term "fluid" as used herein is intended to mean any liquid or gas or combination thereof, or generally any material that cannot sustain a tangential or shearing force when at rest and that undergoes a continuous change in shape when subjected to such stresses.

FIG. 1 illustrates a system 1 for purging a fluid from a vessel 5 according to one or more aspects of the present disclosure. In one or more embodiments, the vessel 5 may be any vessel for holding or transporting fluids such as pipelines, tanks, separators, headers, meter runs, hoses, and pig launchers and receivers. Further, in one or more embodiments, the system 1 may be configured to reduce emissions when purging the fluid from the vessel 5. In one or more embodiments, the system 1 may include an isolation valve 2, the vessel 5 having a housing 10, an inlet and drainage tubing 30, an inlet and drainage valve 32, a vent tubing 40, a check valve 44, a downstream fluid flow line 50, and a purging media unit 60. In one or more embodiments, the housing 10 of the vessel 5 may be coupled to the downstream fluid flow line 50 by way of the isolation valve 2, and system 1 may be configured empty the fluid from within the vessel 5 into the downstream fluid flow line 50. Further, in one or more embodiments, the isolation valve 2 may be a manual valve. Furthermore, when the isolation valve 2 is open, fluid may pass between the housing 10 of the vessel 5 and the downstream fluid flow line 50. Additionally, when the isolation valve 2 is closed, the downstream fluid flow line 50 and housing 10 may be isolated from each other.

Further, a vent tubing 40 containing a check valve 44 may be coupled between the housing 10 of the vessel 5 and the downstream fluid flow line 50. In one or more embodiments, a first end of the vent tubing 40 may be coupled to a vent connector 41 of the housing 10 of the vessel 5, and a second end of the vent tubing 40 may be coupled to a vent connector 42 of the downstream fluid flow line 50. Furthermore, in one or more embodiments, the vent connector 41 of the housing 10 may be disposed along the top of the housing 10 near the highest point in the vessel 5 such that when the housing 10 is filled with a purging media, fluids that were carried or transported within the vessel 5 that remained in the vessel 5 after the vessel 5 was emptied into the downstream fluid flow line 50 may be vented through the vent tubing 40. In one or more embodiments, the purging media is an incompressible fluid. By way of example, in one or more embodiments, the purging media is an incompressible liquid such as water, water mixed with additives, a waste product, gasoline, oil, liquid natural gas, or liquid nitrogen. Furthermore, the check valve 44 may be disposed along the vent tubing 40 between the first end of the vent tubing 40 and the second end of the vent tubing 40 and may be configured to allow fluid to flow from the housing 10 to the downstream fluid flow line 50 but prevent fluid from flowing back from the downstream fluid flow line 50 to the housing 10. While a check valve is described herein, one of ordinary skill in the art would understand that in one or more embodiments, any valve that can allow flow in one direction but prevent flow back in the other direction may be used. Further, in one or more embodiments, the vent tubing 40 may include a vent valve 45 disposed between the check valve 44 and the first end of the vent tubing 40. While the vent valve 45 is illustrated as part of the vent tubing 40, one of ordinary skill in the art would understand that in one or more embodiments the vent valve 45 may be separate from the vent tubing 40 and may be coupled directly to the housing 10 of the vessel 5.

Additionally, an inlet and drainage tubing 30 may be coupled to the housing 10 of the vessel 5. In one or more embodiments, the inlet and drainage tubing 30 may be coupled to a bottom of the housing 10. The inlet and drainage tubing 30 is typically coupled to the bottom of the housing 10 such that any purging media in the vessel 5 may be more fully removed from the vessel 5 since the bottom of the housing 10 is the lowest point in the vessel 5. Further, while the inlet and drainage tubing 30, as depicted, acts as both tubing through which purging media is pumped into or extracted from the vessel 5, one of ordinary skill in the art would understand that a separate tubing may be coupled to the vessel 5 or the vessel 5 may include a port for the purpose of injecting purging media into the vessel 5. Furthermore, the inlet and drainage tubing 30 may include an inlet and drainage valve 32 disposed at a distal end of the inlet and drainage tubing 30 from the end that is coupled to the housing 10 of the vessel 5. Additionally, one of ordinary skill in the art would understand that in one or more embodiments where separate tubing or a port is included for injecting purging media into the vessel 5, the tubing or port for injecting purging media into the vessel 5 may be coupled to the housing 10 of the vessel 5 in any location and may include a valve disposed at a distal end from the end that is coupled to the vessel 5.

Further, in one or more embodiments, a purging media unit 60 may be provided and coupled to the inlet and drainage valve 32 to inject purging media into and/or remove purging media from the vessel 5. The purging media unit 60 may include a purging media tank, a first pump, a first pump hose, a first hose reel, and a motor, which are shown in more detail in FIGS. 4A and 4B. In one or more embodiments, the purging media unit may be a mobile unit such as a truck or any other vehicle that can tow a flatbed or trailer on which the purging media tank, the first pump, the first pump hose, the first hose reel, and the motor are disposed. However, in other embodiments, the purging media unit 60 including the purging media tank, the first pump, the first pump hose, the first hose reel, and the motor may be a stationary unit disposed proximate to the vessel 5 when it is coupled to the downstream fluid flow line 50.

Furthermore, in one or more embodiments, when purging media is to be injected into the vessel 5, the first pump may be coupled to the purging media tank, which is at least partially full of purging media, and the inlet and drainage valve 32 by way of the first pump hose, and the first pump may be coupled to the motor such that the motor operates the first pump to inject the purging media from the purging media tank into the vessel 5 through the inlet and drainage valve 32. Separately, in one or more embodiments, when purging media is to be removed from the vessel 5, the first pump may be coupled to the purging media tank, which is at least partially empty, and the inlet and drainage valve 32 by way of the first pump hose, and the first pump may be coupled to the motor such that the motor operates the first pump to remove the purging media from the vessel 5 and refills the purging media tank. In one or more embodiments, the purging media unit 60 may further include a second pump, a second pump hose, and a second hose reel. Further, in one or more embodiments, when purging media is to be removed from the vessel 5, instead of using the first pump, the second pump may be coupled to the purging media tank and the inlet and drainage valve 32 by way of the second pump hose and to the motor such that the motor operates the second pump to remove the purging media from the vessel 5 and refills the purging media tank.

Additionally, in one or more embodiments, the first pump may be a plunger pump. In one or more embodiments, the first pump may be a triplex, positive displacement, reciprocating plunger pump. By way of example only, in one or more embodiments, the first pump may be a CAT 35 series pump. However, one of ordinary skill in the art would understand that the first pump may be any pump that provides a desired pressure and rate when purging media is being pumped into the vessel 5. Further, in one or more embodiments, the desired pressure and rate is dependent on the total volume of purging media needed to be pumped to fill the vessel 5, a desired amount of time to complete filling the vessel 5 with purging media, and the pressure that is needed to overcome a downstream pressure in the downstream fluid flow line 50. Additionally, in one or more embodiments, the second pump may be a rotary vane vacuum pump. By way of example only, in one or more embodiments, the second pump may be an NVE 304 rotary vane vacuum pump. However, one of ordinary skill in the art would understand that the second pump may be any pump that generates a relative vacuum within its capacity in order to draw fluid from the vessel 5.

Further, in one or more embodiments, when purging the purging media from the vessel 5, the purging media may be run through a filter (not shown) so as to filter the purging media of any particulate or other waste products before it is returned to the purging media tank. In one or more embodiments, the filter may be coupled between the hose being used to purge the vessel 5 and either the inlet and drainage valve 32 or the purging media tank such that the purging media is filtered before it reaches the purging media tank. In other embodiments, the filter may be disposed within the hose being used to purge the vessel 5 or within an inlet of the purging media tank.

Furthermore, in one or more embodiments, the purging media tank may include a first bladder for storing the purging media before it is injected into the pig launcher/receiver and a second bladder for storing the purging media after it has been removed from the vessel 5. Thus, in one or more embodiments, the first pump may be separately coupled to a first bladder of the purging media tank and a second bladder of the purging media tank. In other embodiments, the first pump may be coupled to the first bladder of the purging media tank and the second pump may be coupled to the second bladder of the purging media tank. However, in other embodiments, two separate purging media tanks may be included with the first pump separately coupled to a first purging media tank and a second purging media tank, or with the first pump coupled to the first purging media tank and the second pump coupled to the second purging media tank. Additionally, in other embodiments, the purging media tank may include a single bladder with the first pump or the first pump and the second pump coupled thereto. Further, one of ordinary skill in the art would understand that in one or more embodiments, where a separate tubing with a valve or port are included for injecting purging media into the vessel 5, the first pump may be coupled thereto while the second pump is coupled to the inlet and drainage valve 32, which would act solely as a drainage valve. Additionally, when the purging media unit 60 is in transit or is not being used, the first pump hose and the second pump hose may be stored on the first hose reel and the second hose reel, respectively.

Figure 2:
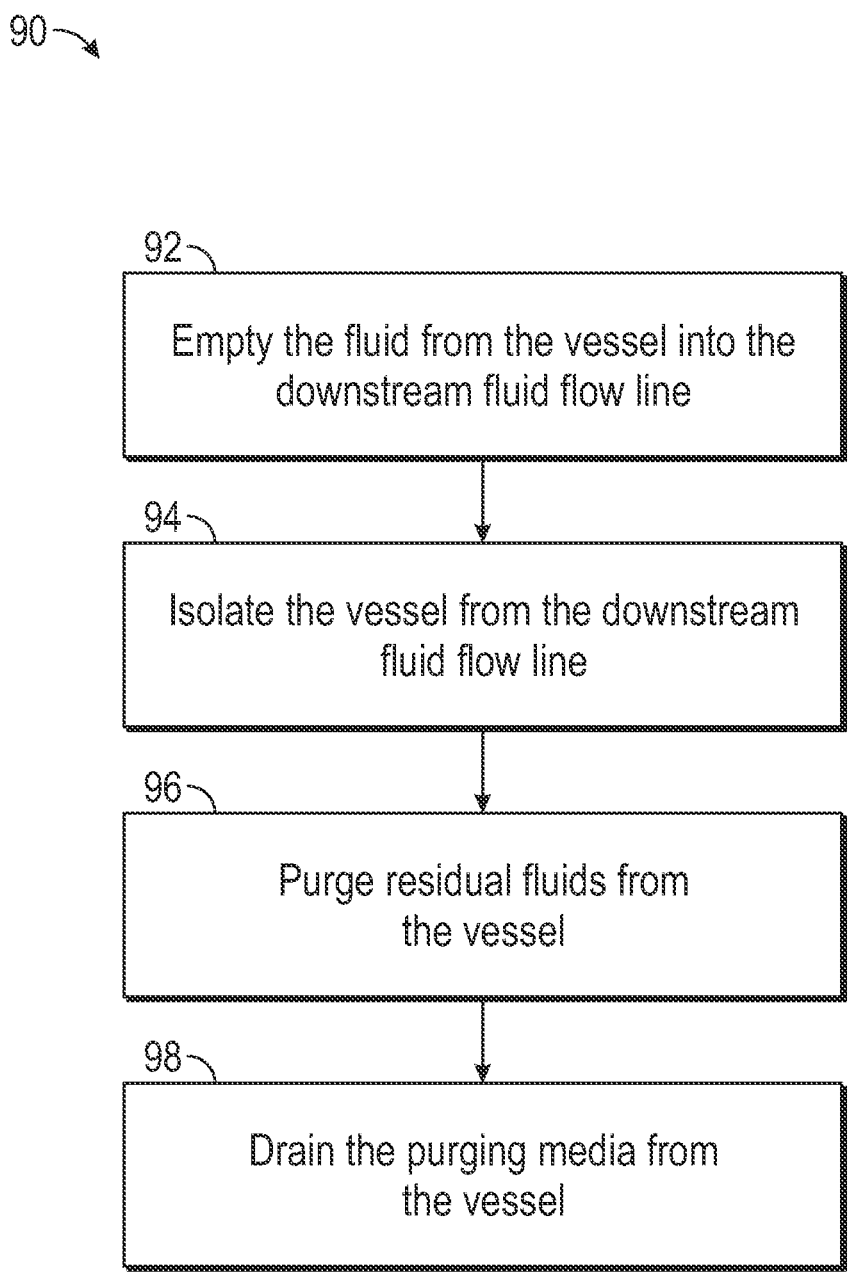
FIG. 2 is a flow chart illustrating a method for reducing emissions from a vessel holding a fluid to be purged when purging the fluid according to one or more aspects of the present disclosure.

FIG. 2 is a flow chart illustrating a method 90 for reducing emissions from a vessel holding a fluid to be purged when purging the fluid according to one or more aspects of the present disclosure. At step 92, the fluid is emptied from the vessel 5 into the downstream fluid flow line 50. In one or more embodiments, emptying the fluid from the vessel 5 into the downstream fluid flow line 50 may include opening the isolation valve 2.

At step 94, once the fluid has been emptied into the downstream fluid flow line 50, vessel 5 is isolated from the downstream fluid flow line 50. In one or more embodiments, isolating the vessel 5 from the downstream fluid flow line 50 may include closing the isolation valve 2.

At step 96, residual fluids in the vessel 5 are purged from the vessel 5. In one or more embodiments, purging residual fluids from the vessel 5 may include injecting purging media into the vessel 5, which pushes all residual fluids through the check valve 44 of the vent tubing 40 and into the downstream fluid flow line 50. Further, injecting purging media into the vessel 5 to purge residual fluids from the vessel 5 may include providing a purging media tank, a first pump, a first pump hose, and a motor. Further, in one or more embodiments, the purging media tank, the first pump, the first pump hose, and the motor may be coupled to a purging media unit 60, and the purging media unit 60 may be transported to a site of the vessel 5 and the downstream fluid flow line 50. Further, in one or more embodiments, injecting purging media into the vessel 5 may include coupling the first pump hose of the purging media unit 60 to an inlet and drainage valve 32 and powering on the motor to operate the first pump to pump purging media from the purging media tank into the vessel 5.

At step 98, the purging media is drained from the vessel 5. In one or more embodiments, draining the purging media from the vessel 5 may include providing the purging media tank, the first pump, the first pump hose, and the motor. Further, in one or more embodiments, the purging media tank, the first pump, the first pump hose, and the motor may be coupled to the purging media unit 60, and the purging media unit 60 may be transported to the site of the vessel 5 and the downstream fluid flow line 50. Furthermore, draining the purging media from the vessel 5 may include opening the vent valve 45. Additionally, in one or more embodiments, draining the purging media from the vessel 5 may include coupling the first pump hose of the purging media unit 60 to the inlet and drainage valve 32 and powering on the motor to operate the first pump to pump purging media from the vessel 5 into the purging media tank. In other embodiments, draining the purging media from the vessel 5 may include providing the purging media tank, a second pump, a second pump hose, and the motor. Further, in one or more embodiments, the second pump and the second pump hose may be coupled to the purging media unit 60 transported to the site of the vessel 5 and the downstream fluid flow line 50 in addition to the purging media tank and the motor. Furthermore, draining the purging media from the vessel 5 may include opening the vent valve 45. Additionally, in one or more embodiments, draining the purging media from the vessel 5 may include coupling the second pump hose of the purging media unit 60 to the inlet and drainage valve 32 and powering on the motor to operate the second pump to pump purging media from the vessel 5 into the purging media tank.

Figure 3:
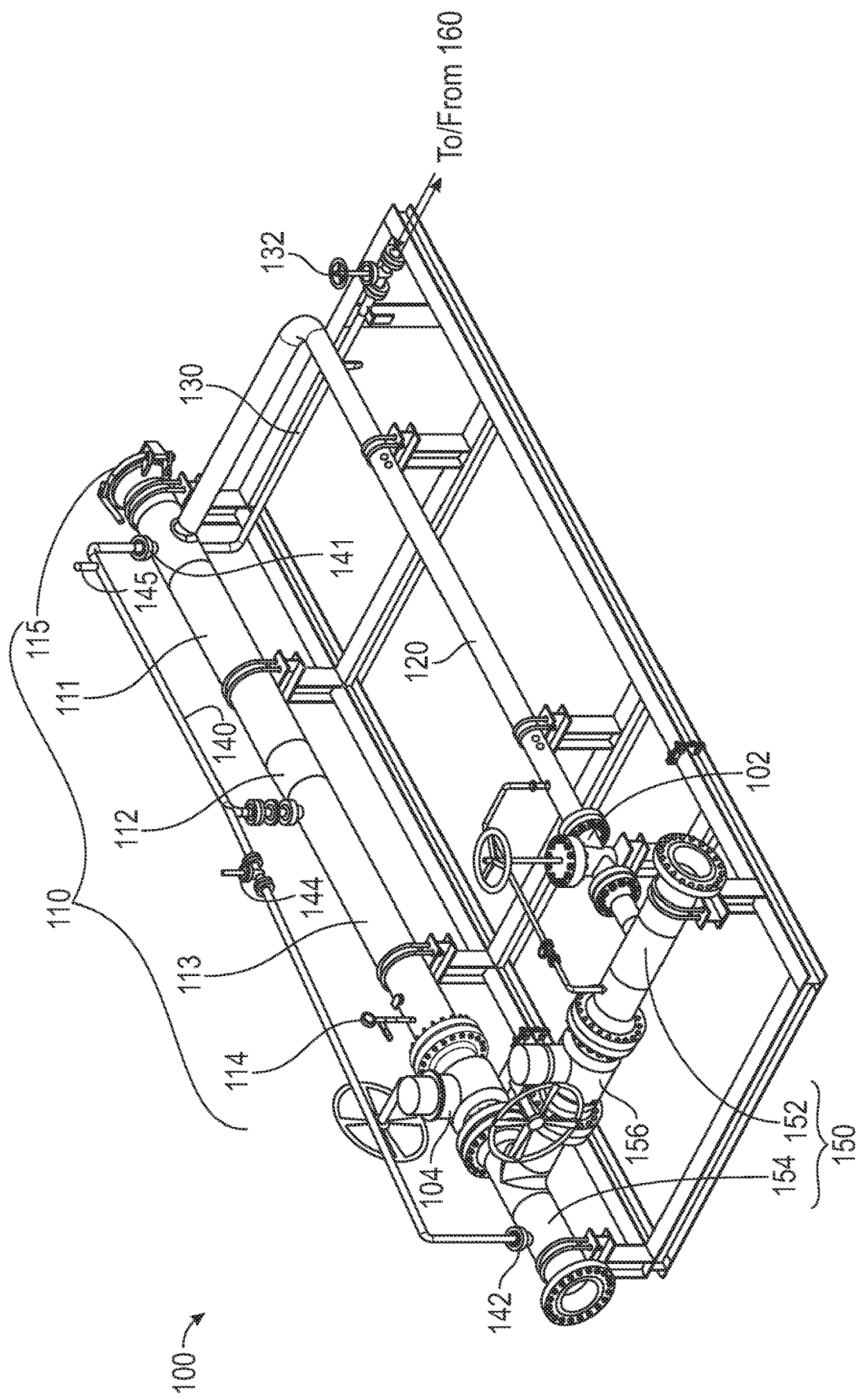
FIG. 3 is an illustrative pig launcher/receiver for inserting a pig into or removing a pig from a pipeline according to one or more aspects of the present disclosure.

FIG. 3 illustrates a pig launcher/receiver 100 for inserting a pig (not shown) into or removing a pig from a pipeline according to one or more aspects of the present disclosure. The pig launcher/receiver 100 may be coupled to a portion of pipeline 150. In one or more embodiments, the portion of pipeline 150 may include a first portion 152 and a second portion 154. Further, the first portion 152 and the second portion 154 of the portion of pipeline 150 may be coupled together by way of a bypass valve 156. In one or more embodiments, the bypass valve 156 may be a manual valve. Further, the bypass valve 156 may be open, partially closed, or fully closed. When the bypass valve 156 is in the open position, fluid in the pipeline may flow directly between the first portion 152 and the second portion 154, through the bypass valve 156 without limitation. Further, when the bypass valve 156 is in the partially closed position, fluid in the pipeline may flow directly between the first portion 152 and the second portion 154, but at a reduced flow rate, where the flow rate is reduced more the more the bypass valve 156 is closed. Furthermore, when the bypass valve 156 is in the fully closed position, fluid in the pipeline may be prevented from flowing directly between the first portion 152 and the second portion 154.

In one or more embodiments, the pig launcher/receiver 100 may include an isolation valve 102, a mainline valve 104, a housing 110, a first tubing 120, an inlet and drainage tubing 130, an inlet and drainage valve 132, a vent tubing 140, a check valve 144, and a purging media unit 160. In one or more embodiments, the housing 110 may include an oversized portion 111, a reduction portion 112, a pipeline sized portion 113, a pressure gauge 114, and a closure door 115. The reduction portion 112 may be disposed between the oversized portion 111 and the pipeline sized portion 113, and the reduction portion 112 may reduce in diameter from the diameter of the oversized portion 111 to the diameter of the pipeline sized portion 113. While the pig launcher/receiver 100, as illustrated, includes a housing having an oversized portion, a reduction portion, and a pipeline sized portion, one of ordinary skill in the art would understand that in one or more embodiments, the housing may be of uniform diameter. Further, the pressure gauge 114 may be coupled to the pipeline sized portion 113 and may measure the pressure within the housing 110. Furthermore, the closure door 115 may be coupled to an end of the oversized portion 111 of the housing 110 distal to the reduction portion 112 and the pipeline sized portion 113. In one or more embodiments, when closed, the closure door 115 may seal the housing 110 such that the housing 110 is isolated from the environment and fluids within the housing 110 do not escape the housing 110 and enter the environment. Further, the closure door 115 may be opened so as to allow for the insertion of one or more pigs into or retrieval of one or more pigs from the housing 110.

In one or more embodiments, the pipeline sized portion 113 of the housing 110 may be coupled to the second portion 154 of the pipeline 150 by way of the mainline valve 104. The pipeline sized portion 113, and the housing 110 in general, may be axially aligned with the second portion 154 of the pipeline 150 such that one or more pigs may be inserted into or received from the second portion 154 of the pipeline from the housing 110 of the pig launcher/receiver 100. Thus, when the mainline valve 104 is open, one or more pigs and fluid from the pig launcher/receiver 100 may pass through the mainline valve 104. Further, when the mainline valve 104 is closed, one or more pigs and/or fluid within the pig launcher/receiver 100 may be prevented from entering the pipeline 150. Additionally, in one or more embodiments, the mainline valve 104 may be a manual valve.

Further, the first tubing 120 of the pig launcher/receiver 100 may be coupled to the oversized portion 111 of the housing 110 proximate to the door closure 115. Additionally, the first tubing 120 of the pig launcher/receiver 100 may be coupled to the first portion 152 of the pipeline 150 by way of the isolation valve 102. Thus, in one or more embodiments, the housing 110 may be coupled to the first portion of the pipeline 152 by way of the first tubing 120 and the isolation valve 102. Further, in one or more embodiments, the isolation valve 102 may be a manual valve. Furthermore, when the isolation valve 102 is open, fluid may pass between the first portion 152 of the pipeline 150 and the housing 110. Additionally, when the isolation valve 102 is closed, the pipeline 150 and housing 110 may be isolated from each other. One of ordinary skill in the art would understand that in a pig launcher, the isolation valve may be considered a kicker valve and the first tubing may be considered a kicker tubing, which communicate pipeline fluid from the first portion of the pipeline to the housing of the pig launcher. Further, one of ordinary skill in the art would understand that in a pig receiver, the isolation valve may be considered a return valve and the first tubing may be considered a return tubing, which communicate pipeline fluid back from the housing of the pig receiver to the first portion of the pipeline. Additionally, while a first tubing 120 is depicted, one of ordinary skill in the art would understand that in one or more embodiments, the housing 110 may be coupled directly to the isolation valve 102 which is coupled directly to the first portion 152 of the pipeline 150.

Furthermore, a vent tubing 140 containing a check valve 144 may be coupled between the pig launcher/receiver 100 and the pipeline 150. In one or more embodiments, a first end of the vent tubing 140 may be coupled to a vent connector 141 of the housing 110 of the pig launcher/receiver 100, and a second end of the vent tubing 140 may be coupled to a vent connector 142 of the second portion 154 of the pipeline 150. Further, in one or more embodiments, the vent connector 141 of the housing 110 may be disposed along the top of the housing 110 near the highest point in the pig launcher/receiver 100 such that when the housing is filled with a purging media, pipeline fluids contained within the pig launcher/receiver 100 may be more easily vented through the vent tubing 140. In one or more embodiments, the purging media may be an incompressible fluid. By way of example, in one or more embodiments, the purging media may be an incompressible liquid such as water, water mixed with additives, a waste product, gasoline, oil, liquid natural gas, or liquid nitrogen. Furthermore, the check valve 144 may be disposed along the vent tubing 140 between the first end of the vent tubing 140 and the second end of the vent tubing 140 and may be configured to allow fluid to flow from the housing 110 to the pipeline 150 but prevent fluid from flowing back from the pipeline 150 to the housing 110. While a check valve is described herein, one of ordinary skill in the art would understand that in one or more embodiments, any valve that can allow flow in one direction but prevent flow back in the other direction may be used. Further, in one or more embodiments, the vent tubing 140 may include a vent valve 145 disposed between the check valve 144 and the first end of the vent tubing 140. While the vent valve 145 is illustrated as part of the vent tubing 140, one of ordinary skill in the art would understand that in one or more embodiments the vent valve 145 may be separate from the vent tubing 140 and may be coupled directly to the housing 110 of the pig launcher/receiver 100.

Additionally, an inlet and drainage tubing 130 may be coupled to the oversized portion 111 of the housing 110. In one or more embodiments, the inlet and drainage tubing 130 may be coupled to a bottom of the oversized portion 111 of the housing 110. The inlet and drainage tubing 130 is typically coupled to the bottom of the housing 110 such that any purging media in the pig launcher/receiver 100 may be more fully removed from the pig launcher/receiver since the bottom of the housing 110 is the lowest point in the pig launcher/receiver 100. However, while the inlet and drainage tubing 130 is illustrated as coupled to the bottom of the oversized portion 111 of the housing 110, one of ordinary skill in the art would understand that for the purpose of draining the pig launcher/receiver 100, the inlet and drainage tubing 130 may be coupled to the bottom of any portion of the housing 110 so long as it is at or near the lowest point in the pig launcher/receiver 100. Further, while the inlet and drainage tubing 130, as depicted, acts as both tubing through which purging media is pumped into or extracted from the pig launcher/receiver 100, one of ordinary skill in the art would understand that a separate tubing may be coupled to the pig launcher/receiver 100 or the pig launcher/receiver 100 may include a port for the purpose of injecting purging media into the pig launcher/receiver 100.

Further, the inlet and drainage tubing 130 may include an inlet and drainage valve 132 disposed at a distal end of the inlet and drainage tubing 130 from the end that is coupled to the housing 110. Additionally, one of ordinary skill in the art would understand that in one or more embodiments where separate tubing or a port is included for injecting purging media into the pig launcher/receiver 100, the tubing or port for injecting purging media into the pig launcher/receiver 100 may be coupled to the pig launcher/receiver in any location and may include a valve disposed at a distal end from the end that is coupled to the pig launcher/receiver.

Furthermore, in one or more embodiments, a purging media unit 160 may be provided and coupled to the inlet and drainage valve 132 to inject purging media into and/or remove purging media from the pig launcher/receiver 100. The purging media unit 160 may include a purging media tank, a first pump, a first pump hose, a first hose reel, and a motor, which are shown in more detail in FIGS. 4A and 4B. In one or more embodiments, the purging media unit may be a mobile unit such as a truck or any other vehicle that can tow a flatbed or trailer on which the purging media tank, the first pump, the first pump hose, the first hose reel, and the motor are disposed. However, in other embodiments, the purging media unit 160 including the purging media tank, the first pump, the first pump hose, the first hose reel, and the motor may be a stationary unit disposed proximate to the pig launcher/receiver 100.

Furthermore, in one or more embodiments, when purging media is to be injected into the pig launcher/receiver 100, the first pump may be coupled to the purging media tank, which is at least partially full of purging media, and the inlet and drainage valve 132 by way of the first pump hose, and the first pump may be coupled to the motor such that the motor operates the first pump to inject the purging media from the purging media tank into the pig launcher/receiver 100 through the inlet and drainage valve 132. Separately, in one or more embodiments, when purging media is to be removed from the pig launcher/receiver 100, the first pump may be coupled to the purging media tank, which is at least partially empty, and the inlet and drainage valve 132 by way of the first pump hose, and the first pump may be coupled to the motor such that the motor operates the first pump to remove the purging media from the pig launcher/receiver 100 and refills the purging media tank. In one or more embodiments, the purging media unit 160 may further include a second pump, a second pump hose, and a second hose reel. Further, in one or more embodiments, when purging media is to be removed from the pig launcher/receiver 100, instead of using the first pump, the second pump may be coupled to the purging media tank and the inlet and drainage valve 132 by way of the second pump hose and to the motor such that the motor operates the second pump to remove the purging media from the pig launcher/receiver 100 and refills the purging media tank.

Further, in one or more embodiments, when purging the purging media from the pig launcher/receiver 100, the purging media may be run through a filter (not shown) so as to filter the purging media of any particulate or other waste products before it is returned to the purging media tank. In one or more embodiments, the filter may be coupled between the hose being used to purge the pig launcher/receiver 100 and either the inlet and drainage valve 132 or the purging media tank such that the purging media is filtered before it reaches the purging media tank. In other embodiments, the filter may be disposed within the hose being used to purge the pig launcher/receiver 100 or within an inlet of the purging media tank.

Furthermore, in one or more embodiments, the purging media tank may include a first bladder for storing the purging media before it is injected into the pig launcher/receiver and a second bladder for storing the purging media after it has been removed from the pig launcher/receiver. Thus, in one or more embodiments, the first pump may be separately coupled to a first bladder of the purging media tank and a second bladder of the purging media tank. In other embodiments, the first pump may be coupled to the first bladder of the purging media tank and the second pump may be coupled to the second bladder of the purging media tank. However, in other embodiments, two separate purging media tanks may be included with the first pump separately coupled to a first purging media tank and a second purging media tank, or with the first pump coupled to the first purging media tank and the second pump coupled to the second purging media tank. Additionally, in other embodiments, the purging media tank may include a single bladder with the first pump or the first pump and the second pump coupled thereto. Further, one of ordinary skill in the art would understand that in one or more embodiments, where a separate tubing with a valve or port are included for injecting purging media into the pig launcher/receiver, the first pump may be coupled thereto while the second pump is coupled to the inlet and drainage valve 132, which would act solely as a drainage valve. Additionally, when the purging media unit 160 is in transit or is not being used, the first pump hose and the second pump hose may be stored on the first hose reel and the second hose reel, respectively.

Figure 4A:
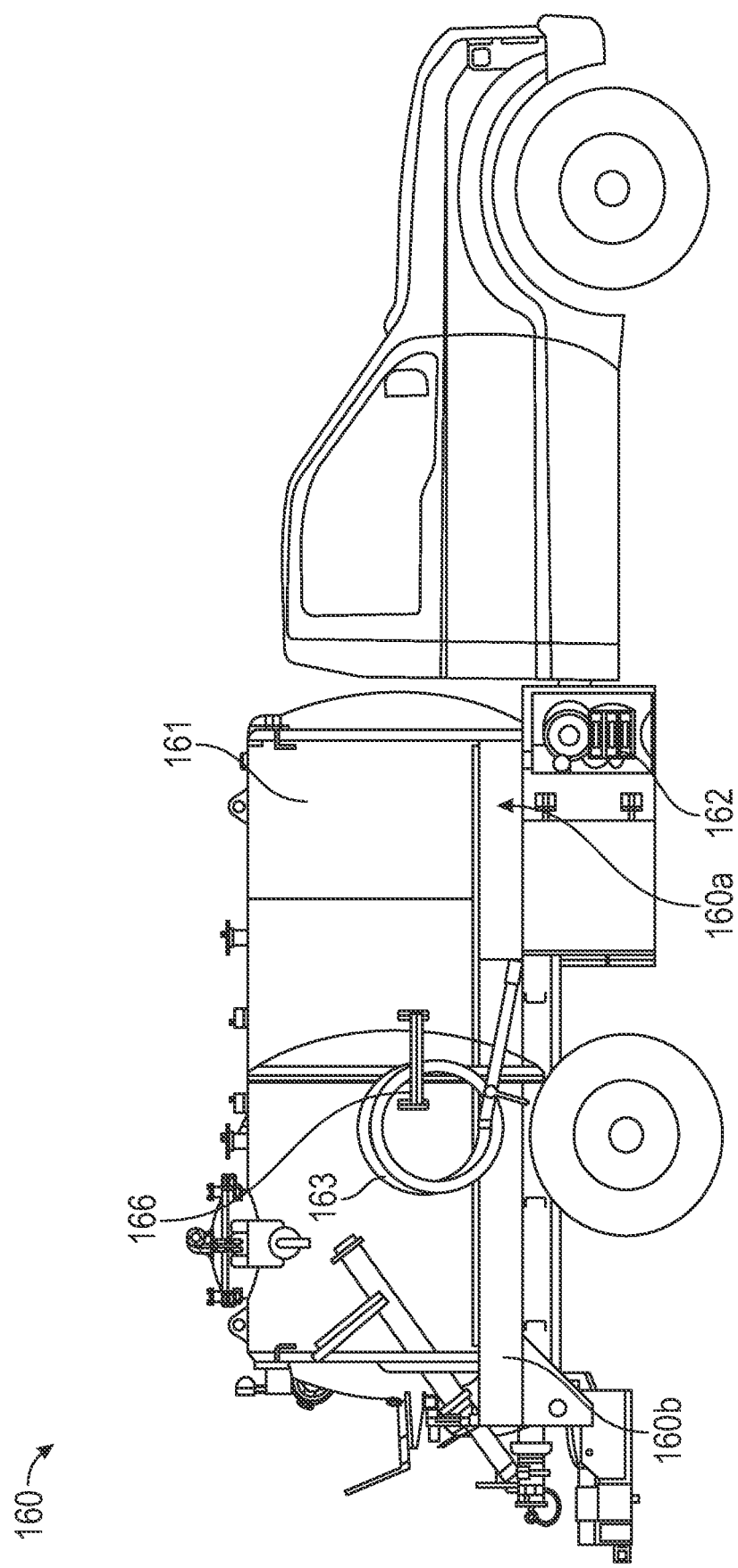
FIGS. 4A and 4B are an illustrative purging media unit according to one or more aspects of the present disclosure.
Figure 4B:
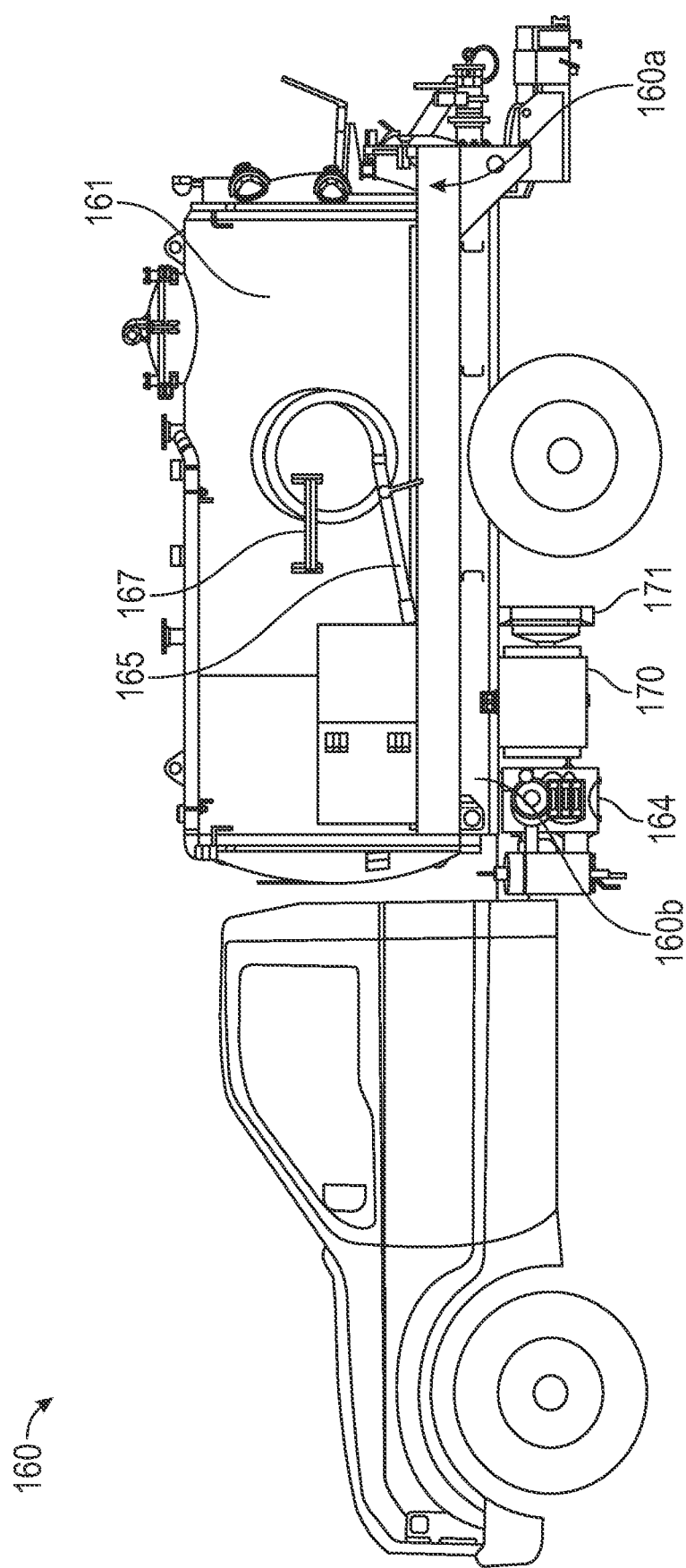

Referring now to FIGS. 4A and 4B, a purging media unit 160 according to one or more aspects of the present disclosure is illustrated. The purging media unit 160 may be a vehicle or trailer 160a containing a flatbed 160b to which a purging media tank 161, a first pump 162, a first pump hose 163, a second pump 164, a second pump hose 165, a first hose reel 166, a second hose reel 167, and a motor (not expressly shown) are physically coupled. As discussed above, in one or more embodiments, the purging media tank 161 may include a first bladder (not shown) and a second bladder (not shown). Further, the first bladder of the purging media tank 161 may be coupled to the first pump 162 by way of the first pump hose 163, and the second bladder of the purging media tank 161 may be coupled to the second pump 164 by way of the second pump hose 165. Thus, the first pump 162 and the second pump 164 may pump purging media out of or into the purging media tank 161, respectively. In one or more embodiments, the purging media tank may be an aluminum purging media tank with a 1,200 gallon capacity separated into two 600 gallon bladders. However, one of ordinary skill in the art would understand that the purging media tank may be made of any material sufficient to hold the volume of purging media needed, and in one or more embodiments, two separate purging media tanks may be used instead of a single purging media tank. Further, as discussed above, in other embodiments, the purging media tank may include a single bladder with the first pump and the second pump coupled thereto. Further, one of ordinary skill in the art would understand that the purging media tank may be of any size as long as the purging media tank can carry a sufficient volume of purging media to fill the entire internal volume of the pig launcher/receiver when the isolation valve 102, the mainline valve 104, and the closure door 115 are all closed.

Furthermore, in one or more embodiments, the first pump 162 may be a plunger pump. Additionally, in one or more embodiments, the first pump 162 may be a triplex, positive displacement, reciprocating plunger pump. By way of example only, in one or more embodiments, the first pump 162 may be a CAT 35 series pump. However, one of ordinary skill in the art would understand that the first pump 162 may be any pump that provides a desired pressure and rate when purging media is being pumped into the pig launcher/receiver 100. Further, in one or more embodiments, the desired pressure and rate is dependent on the total volume of purging media needed to be pumped to fill the pig launcher/receiver, a desired amount of time to complete filling the pig launcher/receiver with purging media, and the pressure that is needed to overcome a downstream pressure in the pipeline 150. Additionally, in one or more embodiments, the second pump 164 may be a rotary vane vacuum pump. By way of example only, in one or more embodiments, the second pump 164 may be an NVE 304 rotary vane vacuum pump. However, one of ordinary skill in the art would understand that the second pump 164 may be any pump that generates a relative vacuum within its capacity in order to draw fluid from the pig launcher/receiver 100.

Additionally, in one or more embodiments, the purging media unit 160 may include a hydraulic reservoir 170 and a hydraulic cooler 171, which are coupled to the first pump 162, the second pump 164, or both in order to operate the first pump 162 and/or the second pump 164. Further, when the purging media unit 160 is in transit or the first pump 162 and the second pump 164 are not being operated, the first pump hose 163 may be stored around a first hose reel 166 coupled to the flatbed 160b and the second pump hose 165 may be stored around a second hose reel 167 coupled to the flatbed 160b. In one or more embodiments, the first hose reel 166 and the second hose reel 167 may be retractable. While two hose reels are shown in FIGS. 4A and 4B, one of ordinary skill in the art would understand that a single hose reel may be provided on which both the first pump hose 163 and the second pump hose 165 may be stored.

Furthermore, in one or more embodiments, the motor may be disposed on the flatbed 160b and may be operationally coupled to both the first pump 162 and the second pump 164 such that it may operate the first pump 162 and the second pump 164 either separately or simultaneously. In one or more embodiments, the motor may be any motor capable of driving the first pump 162 and the second pump 164. Further, in one or more embodiments, the power of the motor to be used is dependent on the desired pressure and flow rate of the purging media. Additionally, in one or more embodiments, the motor may be the motor of the mobile unit, which may be a truck or other vehicle.

Additionally, in one or more embodiments, the purging media unit 160 may include a filter (not shown). When purging the purging media from the pig launcher/receiver 100, the purging media may be run through the filter so as to filter the purging media of any particulate or other waste products before it is returned to the purging media tank 161. In one or more embodiments, the filter may be coupled between the hose being used to purge the pig launcher/receiver 100, which may be the first pump hose 163 or the second pump hose 165, and either the inlet and drainage valve or the purging media tank 161 such that the purging media is filtered before it reaches the purging media tank 161. In other embodiments, the filter may be disposed within the hose being used to purge the pig launcher/receiver 100, which may be the first pump hose 163 or the second pump hose 165, or within an inlet of the purging media tank 161.

Figure 5:
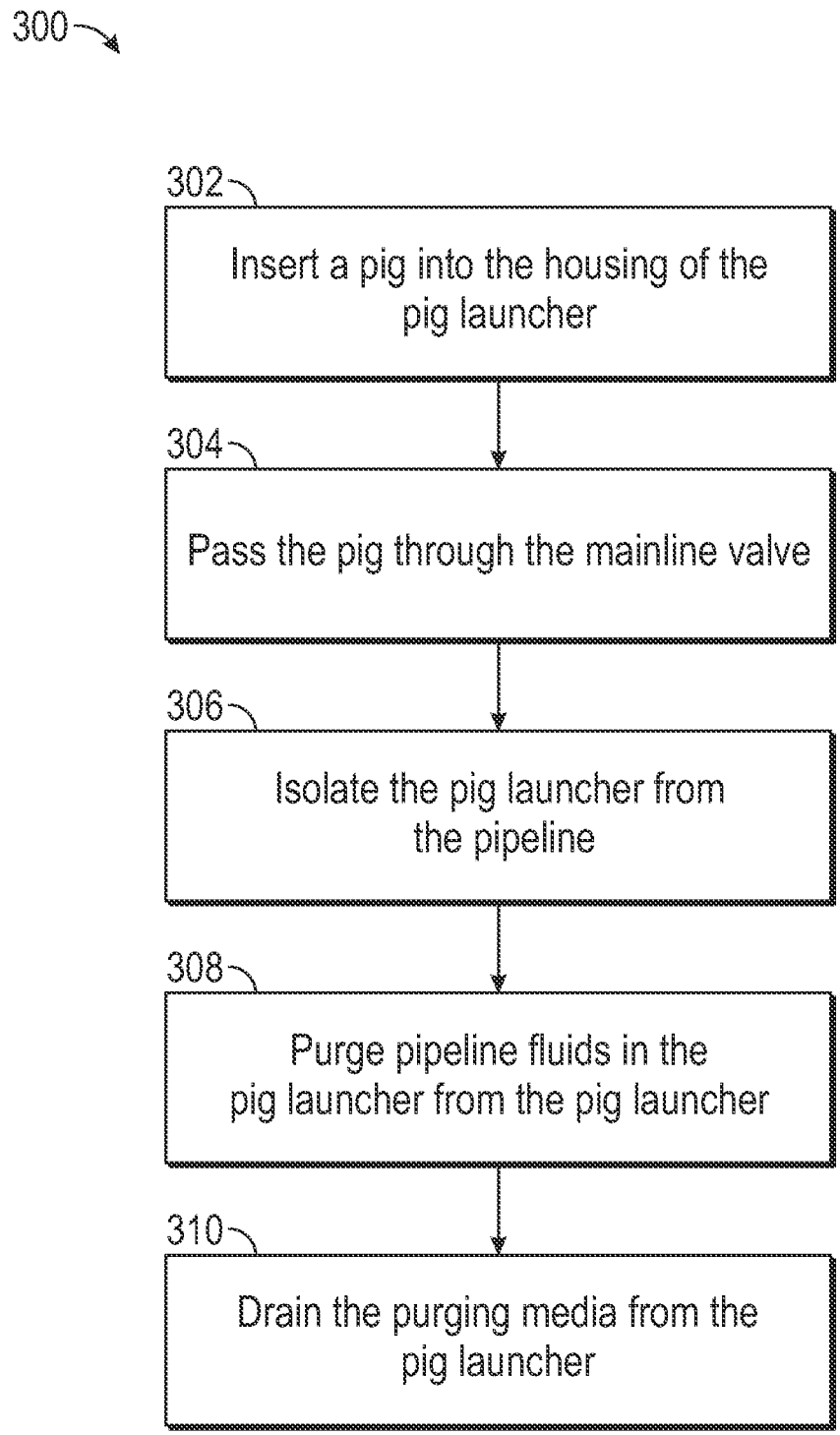
FIG. 5 is a flow chart illustrating a method for reducing emissions from a pipeline intervention system when inserting a pig into a pipeline, according to one or more aspects of the present disclosure.

FIG. 5 is a flow chart illustrating a method 300 for reducing emissions from a pig launcher when inserting a pig into a pipeline, according to one or more aspects of the present disclosure. At step 302, a pig is inserted into the housing 110 of the pig launcher 100. In one or more embodiments, inserting the pig into the housing 110 may include purging pressure from the pig launcher 100 so that the pig launcher 100 is at atmospheric pressure. Purging pressure from the pig launcher 100 may include opening the vent valve 145. Further, inserting the pig into the housing 110 may include opening the closure door 115. In one or more embodiments, inserting the pig into the housing 110 may further include inserting the pig through the opened closure door 115 until the pig is fully within the housing 110 and a portion of the pig is disposed within the reduction portion 112 of the housing 110. In one or more embodiments, when the pig is being inserted into the housing 110, the vent valve 145 may be maintained in the open position while the isolation valve 102 and the mainline valve 104 are maintained in the closed position.

At step 304, the pig is passed through the mainline valve 104. In one or more embodiments, passing the pig through the mainline valve 104 inserts the pig into the pipeline 150. Further, passing the pig through the mainline valve 104 may include closing the vent valve 145 and opening the isolation valve 102 until pressure is equalized between the pig launcher 100 and the pipeline 150. Once pressure is equalized between the pig launcher 100 and the pipeline 150, the mainline valve 104 may be opened and the bypass valve 156 may be partially closed to divert flow within the pipeline 150 through the first tubing 120 and into housing 110 to push the pig out of the housing 110 and into the pipeline 150. Once the pig enters the second portion 154 of the pipeline 150 from the housing 110, the bypass valve 156 may be fully opened.

At step 306, the pig launcher 100 is isolated from the pipeline 150. In one or more embodiments, isolating the pig launcher 100 from the pipeline 150 may include closing the mainline valve 104 and the isolation valve 102.

At step 308, pipeline fluids in the pig launcher 100 are purged from the pig launcher 100. In one or more embodiments, purging residual pipeline fluids from the pig launcher 100 may include injecting purging media into the pig launcher, which pushes all pipeline fluids through the check valve 144 of the vent tubing 140 and back into the pipeline 150. Further, injecting purging media into the pig launcher to purge residual pipeline fluids from the pig launcher 100 may include providing a purging media tank 161, a first pump 162, a first pump hose 163, and a motor. Further, in one or more embodiments, the purging media tank 161, the first pump 162, the first pump hose 163, and the motor may be coupled to a purging media unit 160, and the purging media unit 160 may be transported to a site of the pig launcher 100. Further, in one or more embodiments, injecting purging media into the pig launcher 100 may include coupling the first pump hose 163 of the purging media unit 160 to an inlet and drainage valve 132 and powering on the motor to operate the first pump 162 to pump purging media from the purging media tank 161 into the pig launcher 100.

At step 310, the purging media is drained from the pig launcher 100. In one or more embodiments, draining the purging media from the pig launcher may include providing the purging media tank 161, the first pump 162, the first pump hose 163, and the motor. Further, in one or more embodiments, the purging media tank 161, the first pump 162, the first pump hose 163, and the motor may be coupled to the purging media unit 160, and the purging media unit 160 may be transported to the site of the pig launcher 100. Furthermore, draining the purging media from the pig launcher 100 may include opening the vent valve 145. Additionally, in one or more embodiments, draining the purging media from the pig launcher 100 may include coupling the first pump hose 163 of the purging media unit 160 to the inlet and drainage valve 132 and powering on the motor to operate the first pump 162 to pump purging media from the pig launcher 100 into the purging media tank 161. In other embodiments, draining the purging media from the pig launcher may include providing the purging media tank 161, a second pump 164, a second pump hose 165, and the motor. Further, in one or more embodiments, the second pump 164 and the second pump hose 165 may be coupled to the purging media unit 160 transported to the site of the pig launcher 100 in addition to the purging media tank 161 and the motor. Furthermore, draining the purging media from the pig launcher 100 may include opening the vent valve 145. Additionally, in one or more embodiments, draining the purging media from the pig launcher 100 may include coupling the second pump hose 165 of the purging media unit 160 to the inlet and drainage valve 132 and powering on the motor to operate the second pump 164 to pump purging media from the pig launcher 100 into the purging media tank 161.

Figure 6:
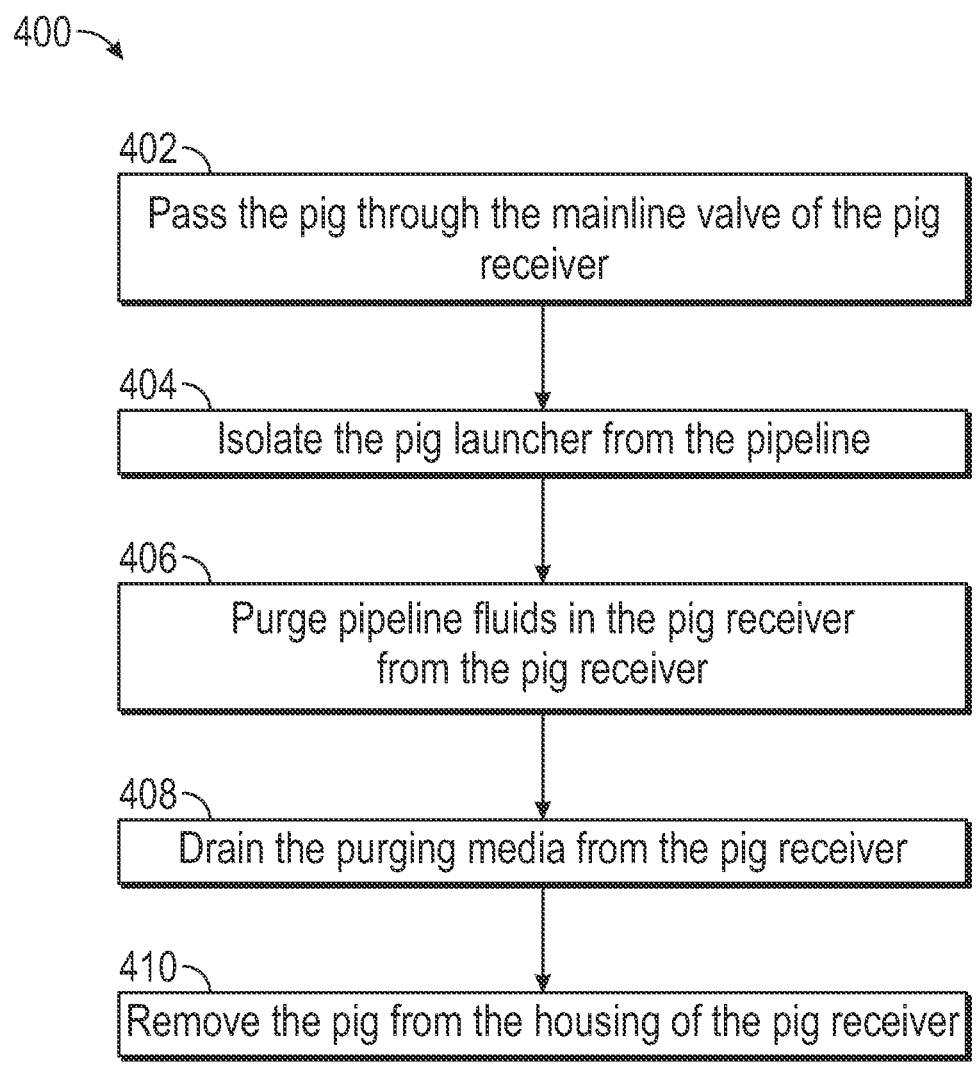
FIG. 6 is a flow chart illustrating a method for reducing emissions from a pipeline intervention system when removing a pig from a pipeline, according to one or more aspects of the present disclosure.

FIG. 6 is a flow chart illustrating a method 400 for reducing emissions from a pig receiver when removing a pig from a pipeline, according to one or more aspects of the present disclosure. At step 402, the pig is passed through a mainline valve 104 of a pig receiver 100. In one or more embodiments, passing the pig through the mainline valve 104 inserts the pig into the pig receiver 100. Further, passing the pig through the mainline valve 104 may include opening the isolation valve 102 until pressure is equalized between the pig receiver 100 and the pipeline 150. Once pressure is equalized between the pig receiver 100 and the pipeline 150, the mainline valve 104 may be opened and the bypass valve 156 may be partially closed to divert flow within the pipeline 150 into the housing 110 to push the pig out of the pipeline 150 and into the housing 110. Once the pig enters the housing 100, the bypass valve 156 may be fully opened.

At step 404, the pig receiver 100 is isolated from the pipeline 150. In one or more embodiments, isolating the pig receiver 100 from the pipeline 150 may include closing the mainline valve 104 and the isolation valve 102.

At step 406, pipeline fluids in the pig receiver 100 are purged from the pig receiver 100. In one or more embodiments, purging residual pipeline fluids from the pig receiver 100 may include injecting purging media into the pig receiver, which pushes all pipeline fluids through the check valve 144 of the vent tubing 140 and back into the pipeline 150. Further, injecting purging media into the pig receiver to purge residual pipeline fluids from the pig receiver 100 may include providing a purging media tank 161, a pump 162, a pump hose 163, and a motor. Further, in one or more embodiments, the purging media tank 161, the first pump 162, the first pump hose 163, and the motor may be coupled to a purging media unit 160, and the purging media unit 160 may be transported to a site of the pig receiver 100. Further, in one or more embodiments, injecting purging media into the pig receiver 100 may include coupling the first pump hose 163 of the purging media unit 160 to an inlet and drainage valve 132 and powering on the motor to operate the first pump 162 to pump purging media from the purging media tank 161 into the pig receiver 100.

At step 408, the purging media is drained from the pig receiver 100. In one or more embodiments, draining the purging media from the pig receiver may include providing the purging media tank 161, the first pump 162, the first pump hose 163, and the motor. Further, in one or more embodiments, the purging media tank 161, the first pump 162, the first pump hose 163, and the motor may be coupled to the purging media unit 160, and the purging media unit 160 may be transported to the site of the pig launcher 100. Furthermore, draining the purging media from the pig launcher 100 may include opening the vent valve 145. Additionally, in one or more embodiments, draining the purging media from the pig launcher 100 may include coupling the first pump hose 163 of the purging media unit 160 to the inlet and drainage valve 132 and powering on the motor to operate the first pump 162 to pump purging media from the pig launcher 100 into the purging media tank 161. In other embodiments, draining the purging media from the pig launcher may include providing the purging media tank 161, a second pump 164, a second pump hose 165, and the motor. Further, in one or more embodiments, the second pump 164 and the second pump hose 165 may be coupled to the purging media unit 160 transported to the site of the pig receiver 100 in addition to the purging media tank 161 and the motor. Furthermore, draining the purging media from the pig receiver 100 may include opening the vent valve 145. Additionally, in one or more embodiments, draining the purging media from the pig receiver 100 may include coupling the second pump hose 165 of the purging media unit 160 to the inlet and drainage valve 132 and powering on the motor to operate the second pump 164 to pump purging media from the pig receiver 100 into the purging media tank 161.

At step 410, the pig is removed from the housing 110 of the pig receiver 100. In one or more embodiments, removing the pig from the housing 110 may include purging pressure from the pig receiver 100 so that the pig receiver 100 is at atmospheric pressure. Purging pressure from the pig receiver 100 may include opening the vent valve 145. Further, removing the pig from the housing 110 may include opening the closure door 115. In one or more embodiments, removing the pig from the housing 110 may further include removing the pig through the opened closure door 115. In one or more embodiments, when the pig is being removed from the housing 110, the vent valve 145 may be maintained in the open position while the isolation valve 102 and the mainline valve 104 are maintained in the closed position.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A system, comprising:
   a vessel, wherein the vessel comprises:
      a housing;
      an isolation valve, wherein the isolation valve is coupled to the housing, and wherein the isolation valve is configured to be coupled to a downstream fluid flow line;
      a vent tubing, wherein a first end of the vent tubing is directly coupled to the housing and a second end of the vent tubing is configured to be directly coupled to the downstream fluid flow line, wherein the vent tubing includes a check valve disposed between the first end of the vent tubing and the second end of the vent tubing, and wherein the check valve is configured to allow a fluid to flow from the housing to the downstream fluid flow line; and
an inlet and drainage valve, wherein the inlet and drainage valve is coupled to the housing;
a purging media tank; and
a first pump, wherein the first pump is coupled to the purging media tank and configured to be coupled to the inlet and drainage valve, and wherein the first pump is configured to pump a purging media between the purging media tank and the housing.

2. The system of claim 1, further comprising:
a purging media unit, wherein the purging media tank, the first pump, and a motor are coupled to the purging media unit.

3. The system of claim 1, wherein system further comprises:
a second pump, wherein the second pump is coupled to the purging media tank and configured to be coupled to the inlet and drainage valve, and wherein the second pump is configured to pump purging media between the housing and the purging media tank.

4. The system of claim 3 wherein the second pump is a vacuum pump.

5. The system of claim 1, wherein:
the first pump is a plunger pump.

6. The system of claim 1, wherein:
the vent tubing is coupled to a top of the housing; and
the inlet and drainage valve is coupled to a bottom of the housing.

7. The system of claim 1, wherein the vessel further comprises:
a vent valve, wherein the vent valve is coupled to the housing; and
an inlet and drainage tubing, wherein the inlet and drainage valve is coupled to the housing by way of the inlet and drainage tubing.

8. The system of claim 1 wherein the vessel is a pipeline, a tank, a separator, a header, a meter run, a hose, a pig launcher, or a pig receiver.

9. A system comprising:
a vessel, wherein the vessel comprises:
a housing;
an isolation valve, wherein the isolation valve is coupled to the housing, and wherein the isolation valve is configured to be coupled to a downstream fluid flow line;
a vent tubing, wherein a first end of the vent tubing is directly coupled to a top of the housing and a second end of the vent tubing is configured to be directly coupled to the downstream fluid flow line, wherein the vent tubing includes a check valve disposed between the first end of the vent tubing and the second end of the vent tubing, and wherein the check valve is configured to allow a fluid to flow from the housing to the downstream fluid flow line; and
an inlet and drainage valve, wherein the inlet and drainage valve is coupled to a bottom of the housing by way of an inlet drainage tubing;
a purging media tank;
a first pump, wherein the first pump is coupled to the purging media tank and configured to be coupled to the inlet and drainage valve, and wherein the first pump is configured to pump a purging media between the purging media tank and the housing;
a purging media unit, wherein the purging media tank, the first pump, and a motor are coupled to the purging media unit;
a second pump, wherein the second pump is coupled to the purging media tank and configured to be coupled to the inlet and drainage valve, and wherein the second pump is configured to pump purging media between the housing and the purging media tank; and
a vent valve coupled to the housing.

10. The system of claim 9 wherein the first pump is a plunger pump.

11. The system of claim 9 wherein the second pump is a vacuum pump.

12. The system of claim 9 wherein the vessel is a pipeline, a tank, a separator, a header, a meter run, a hose, a pig launcher, or a pig receiver.

* * * * *